United States Patent [19]
Swanson

[11] Patent Number: 6,010,056
[45] Date of Patent: Jan. 4, 2000

[54] GIMBAL HORN PRESSURE HEAD WITH SHAPE OF PIVOT ROD BEARING CORRESPONDING TO SHAPE OF CONTACT SURFACE

[76] Inventor: David W. Swanson, 2750 Felicita Rd., Escondido, Calif. 92029

[21] Appl. No.: 08/878,020

[22] Filed: Jun. 18, 1997

[51] Int. Cl.⁷ .................................................. B23K 20/00
[52] U.S. Cl. .......................... 228/44.3; 228/4.1; 228/212; 228/102; 228/180.21
[58] Field of Search .................................. 228/44.3, 4.1, 228/212, 102, 180.21

[56] References Cited

U.S. PATENT DOCUMENTS

| | | | |
|---|---|---|---|
| 3,938,722 | 2/1976 | Kelly et al. | 228/1 |
| 4,037,772 | 7/1977 | Dupuis | 228/1 R |

Primary Examiner—Patrick Ryan
Assistant Examiner—M. Alexandra Elve
Attorney, Agent, or Firm—Calif Tervo

[57] ABSTRACT

A pressure head (10) for contacting a contact area of workpiece (230) through relative movement in the vertical Z-direction includes a frame (20), a horn (100) for contacting the workpiece (230) and a gimbal (40) connected to the frame (20). The gimbal (40) supports the horn (100) such that the horn (100) can rotate about horizontal X and Y rotation axes and can translate in the Z-direction relative to the frame (20). A pivot rod (140) includes a bearing surface (144) bearing against horn (100) such that the horn may rotate about the X-axis and Y-axis and for applying downward pressure to the horn. The shape and orientation of the bearing surface (144) corresponding to the shape and orientation of the contact area of horn (100).

19 Claims, 5 Drawing Sheets

GIMBAL HORN PRESSURE HEAD WITH SHAPE OF PIVOT ROD BEARING CORRESPONDING TO SHAPE OF CONTACT SURFACE

CROSS REFERENCE TO RELATED APPLICATION

This application is related to my co-pending application Ser. No. 08/806088 filed Feb. 25, 1997 titled PRESSURE HEAD WITH PIVOT ROD GIMBAL WITH ZERO ADJUST which is herein incorporated by reference as if fully set forth at length herein.

BACKGROUND OF THE INVENTION

1. Field of the Invention

This invention relates in general to a pressure head for bonding parts with heat and pressure, the head having a gimbaled horn that pivots on a push rod, wherein the shape and orientation of the push rod bearing surface corresponds to the shape and orientation of the contact surface with the part being bonded. More specifically, the bearing surface is elliptical and varies between being circular and linear.

2. Description of the Related Art

A thrust head or head is commonly used to attach one item to another. The head must move relative to the workpiece. In some applications the workpiece is moved into contact with the head. In other applications, the head is moved by a thruster, such as a pneumatic cylinder. The horn, that is the working element of the head, may be heated for bonding workpieces together, that is for bonding one article to another with heat and pressure. For example, a horn may bond a flexible circuit to an electronic component or may bond a flip chip to the electronic package circuitry.

In many applications, but particularly when heat and pressure are to be applied in the bonding, it is imperative that the contact surface of the horn Lace, align perfectly with the contact surface of the workpiece. One method of horn alignment to solve this problem has been to gimbal the horn such that, upon encountering the workpiece, the horn rotates to alignment.

In many applications with workpieces requiring very close bonding tolerances, it imperative that the force exerted on the horn by the workpiece required to align the gimbaled horn with the workpiece be extremely small. This is necessitated because the gimbaled horn not only rotates as it is aligned but also moves sideways thereby producing shear forces on the workpiece. If the rotational force is more than de minimis, then the shear force created in the rotation will disrupt the workpiece. Consequently, the mass of the gimbaled head needs to be minimized and the lever arm from the point of alignment force to the gimbal point or axis need to be maximized. Even the forces required to overcome the static friction of bearings in many conventional gimbaled horns or to overcome the moment and resistance to rotation created by wires leading to the heating element and thermocouple on the gimbaled horn are too large for use in some high tolerance applications.

My co-pending application, Ser. No. 08/806088 filed Feb. 25, 1997 titled PRESSURE HEAD WITH PIVOT ROD GIMBAL WITH ZERO ADJUST, describes a gimbaled horn not fixed in the head in the up/down direction, such that, upon first encountering the workpiece the horn can move within the head such that much lower shear forces are generated on the workpiece.

However, even with the above design, the shape and size of the bearing determines the magnitude of the moment forces required to overcome the bearing friction. Basically, the larger the bearing surface and the further from the pivot point, the larger the moment needed to overcome bearing friction.

Also, the shape of the workpiece also determines the amount of alignment force. For example, if the workpiece is long and narrow, then only small forces are needed at the longer distance to align the horn while large forces are required at the narrow distance to align the horn.

Therefore it is desirable that a gimbaled horn be adapted so that minimal force from the workpiece aligns the horn face with the workpiece.

SUMMARY OF THE INVENTION

This invention is a pressure head for contacting a contact area on a workpiece through relative movement in the vertical Z-direction. The head includes in general a frame, a gimbal supported by the frame, a pivot rod supported by the frame and a horn supported by the gimbal.

The horn has a top and has a bottom having a contact area for contacting the contact area of the workpiece. The horn is supported by the gimbal so as be rotatable about horizontal and orthogonal X and Y axes. In the preferred embodiment, the gimbal also supports the horn such that the horn can translate in the Z-direction relative to the frame.

The pivot rod has an upper end and has a lower end including a bearing surface bearing against said top of the horn such that the horn may rotate about the X-axis and Y-axis and for applying downward pressure to the horn. The shape and orientation of the bearing surface corresponding to the shape and orientation of the contact area of the bottom of the horn. Preferably, the bearing surface has a substantially elliptical shape in top view with its size and orientation corresponding to the shape and orientation in top view of the envelope of the contact area of the bottom of the horn. Thus, at one extreme, a circular bearing surface will correspond to a square or circular horn contact area and, at the other extreme, a linear or blade-like bearing surface will correspond to a long, narrow contact area.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
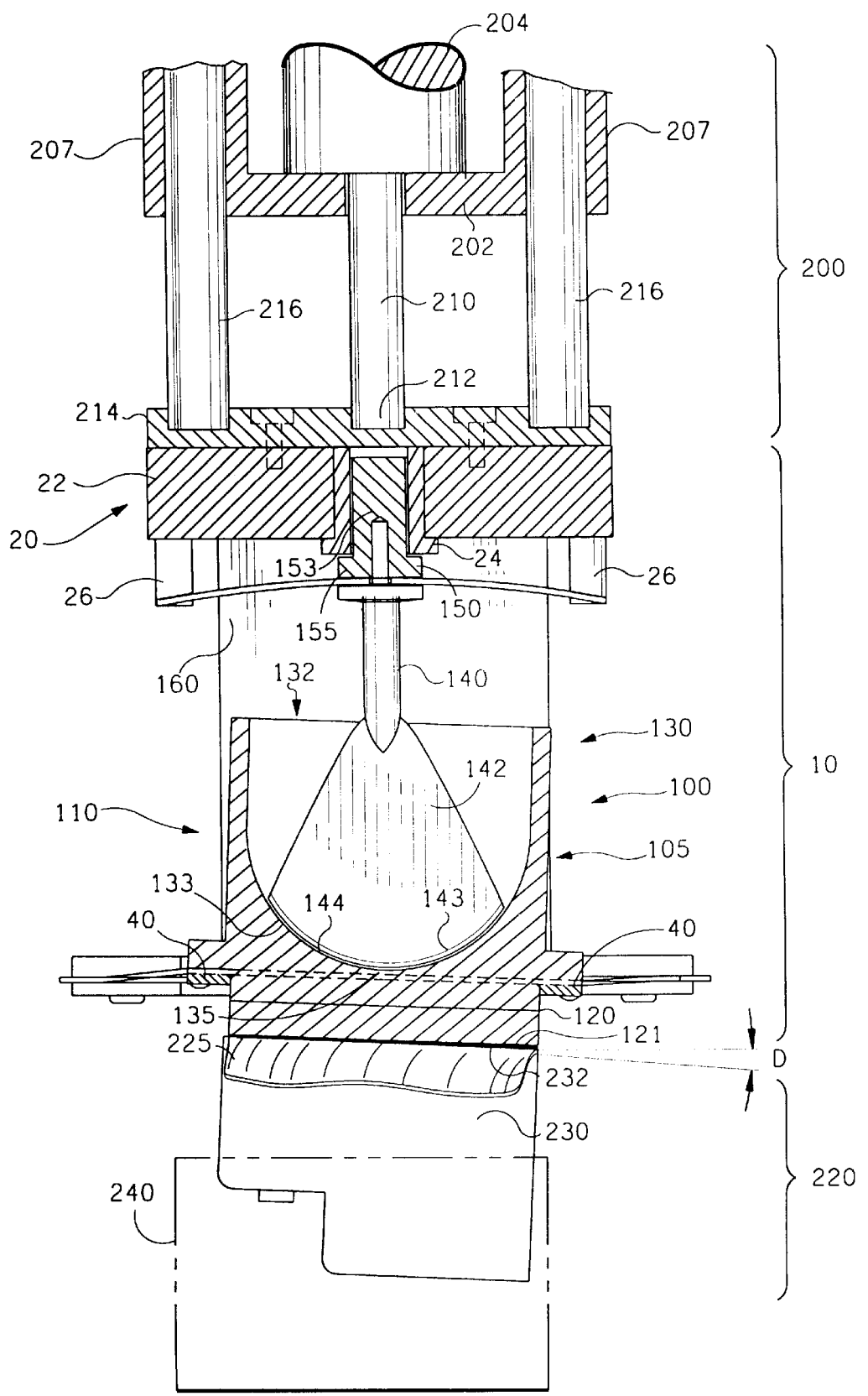
FIG. 1 is a left side elevation view, partially in section and partially cut away, of the head of the invention shown attached to a linear thruster and bonding a flexible circuit (shown in perspective) onto an electronic article.

With reference now the drawings, there is shown in FIG. 1 a left side view, partially in section and partially cut away, of the head, denoted in general as 10, of the invention shown attached to a linear thruster, denoted in general as 200, and bonding workpieces 220, such as a flexible circuit 225, shown in perspective, and an electronic article 230. Electronic article 230 is held in holding fixture 240.

For ease of description with reference to the drawings, the direction (generally vertical) of movement of head 10 relative to workpieces 220 is considered the Z direction; the left/right direction is the X direction and the front/back direction is the Y direction.

Linear thruster 200 moves head 10 up and down in the Z direction to engage and disengage from workpieces 220. Linear thruster 210 generally includes a housing 202 supporting a pneumatic cylinder 204 and guide blocks 207 containing bearings. Push rod 210 is connected to and driven up and down by a piston, not shown, in pneumatic cylinder 204. The distal end 212 of push rod 210 is connected to and moves thrust plate 214. A pair of guide rods 216, slidingly supported by bearings in guide blocks 207 and having their lower end connected to thrust plate 214, move with thrust plate 214 and retain it in the path of desired movement. Although linear thruster 210 is shown moving head 10, many other devices may be used to cycle the head/workpiece contact, including devices moving workpieces 220.

By way of example as seen in FIG. 1, a flexible circuit 225 is being bonded to the upper surface 232 of electronic part 230. Electronic part 230 is supported to holding fixture 240. The workpiece face, in this case the upper surface 232 of electronic part 230, is slanted or angled in the X-axis an angle D from horizontal. Upper surface 232 may also be slanted in the Y-axis direction. The angling of workpiece face 232 may be the result of many factors or the combination thereof, such as imperfect placement in holding fixture 240 or tolerances in fabrication of the part 230. The contact area of the workpiece is the workpiece area that contacts pressure head 10. The contact area is generally determined by the size and shape of the workpieces being joined. In the illustration, a ribbon or flexible circuit 225 is being joined to electrical component 230. This typically requires a long, narrow contact area. In the illustration, the contact area of horn 100 is the entire area of bottom 121 of horn tip 120. In FIG. 1, horn 100 is shown pivoted about push rod bearing surface 144 an angle D relative to the X-axis to align with workpiece 230.

As an overview, head 10 is shown in bonding position. Horn 100 of head 10, gimbaled on gimbal 40, has rotated such that the horn bottom 121 is aligned with workpiece face 232. Pivot rod 140 is applying pressure from thruster 200 to horn 100 and thus to workpieces 220.

Figure 2:
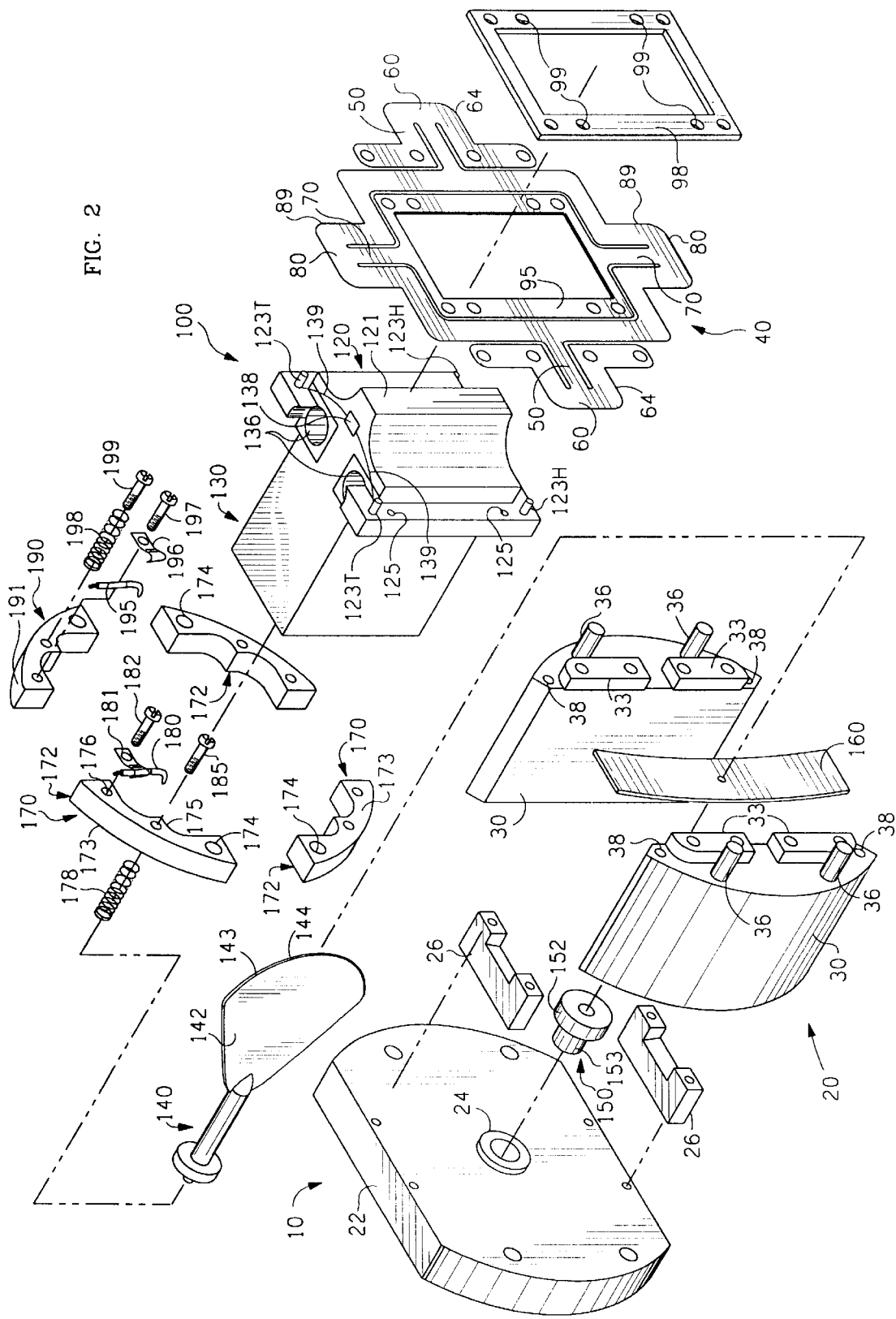
FIG. 2 is an exploded perspective view of the head of FIG. 1.
Figure 3:
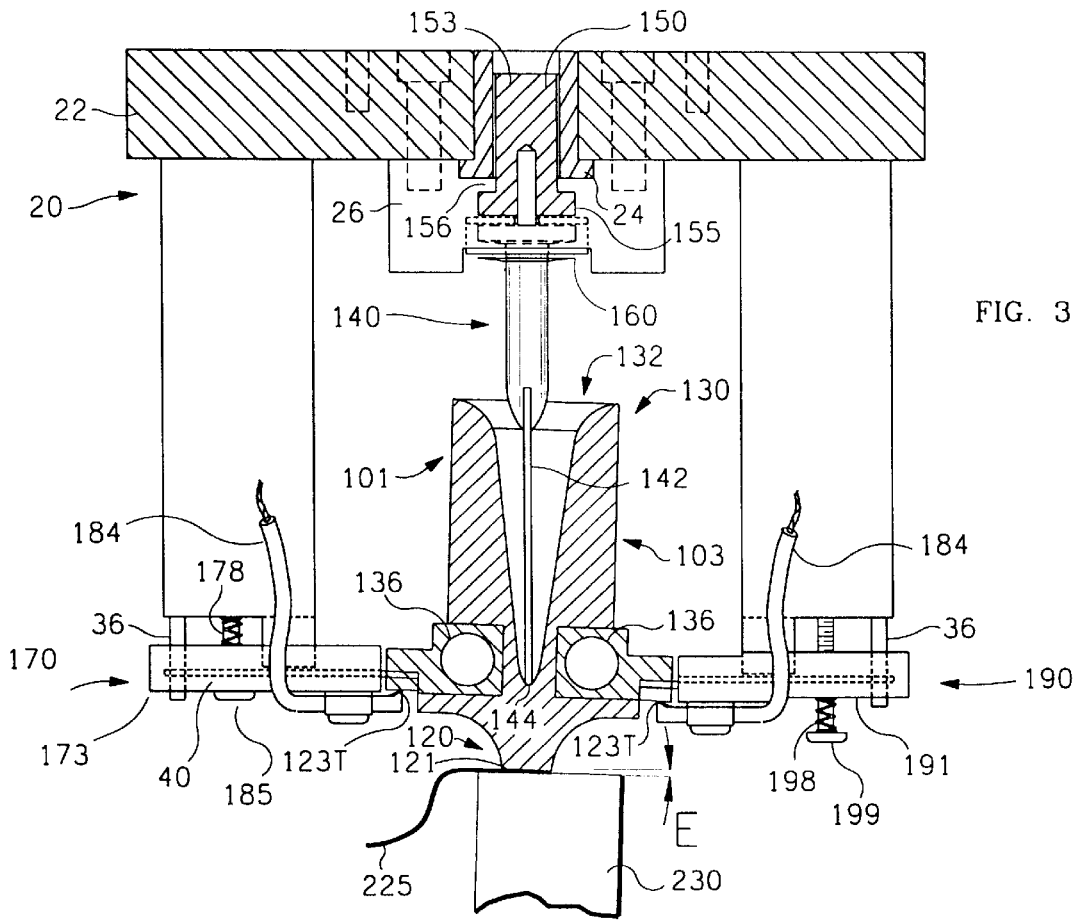
FIG. 3 is a front sectional elevation view of the head of FIG. 1 showing a zero adjust contact and a thermocouple contact.
Figure 4:
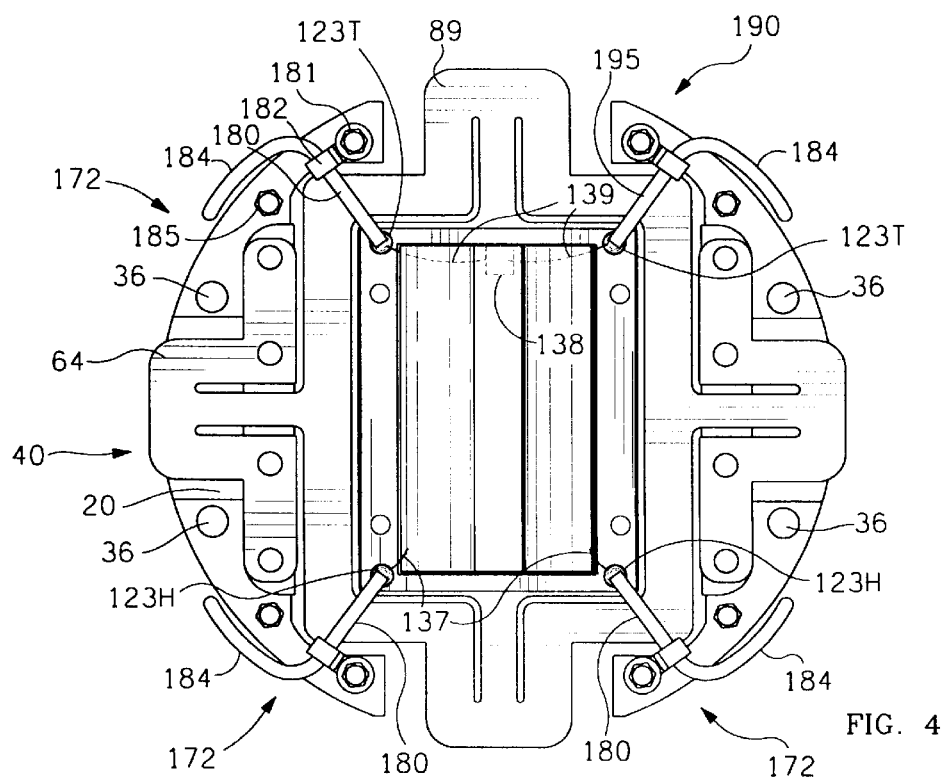
FIG. 4 is a bottom plan view of the head of FIG. 3.

Now including FIGS. 2, 3 and 4; FIG. 2 is an exploded perspective view of the head 10 of FIG. 1. FIG. 3 is a front sectional elevation view of the head 10 of FIG. 1 showing a zero adjust assembly 172 and a thermocouple contact assembly 190. In FIG. 3, the contact surface of workpieces 220 is shown to be an angle E off the horizontal in the Y-axis and horn 100 is shown to have rotated about bearing surface 144 the angle E so that its contact surface is aligned therewith. FIG. 4 is a bottom plan view of FIG. 3.

Head 10 generally comprises a frame 20, gimbal means, such as leaf spring gimbal 40, horn 100, pivot rod 140, horn biasing spring 160 and zero adjustment means including zero adjustment assemblies 172.

Figure 5:
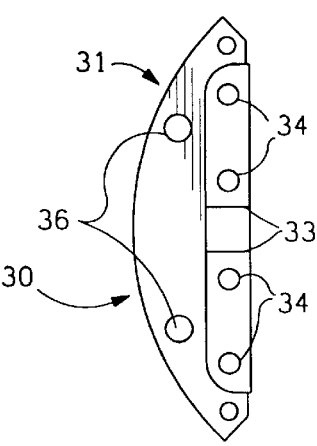
FIG. 5 is a bottom plan view of the frame sides.
Figure 5:
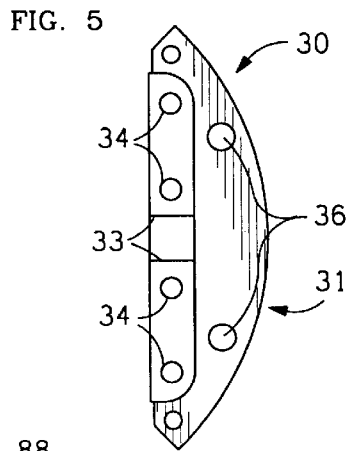

Frame 20 comprises a base 22 and a pair of spring supports 26 for horn biasing spring 160 and a pair of spaced apart side walls 30 connected to base 22. The distal or lower end 31 of each side wall 30 includes a gimbal support 33. FIG. 5 is a bottom plan view of the frame side walls 30 showing bottom end 31 and gimbal supports 33.

Figure 6:
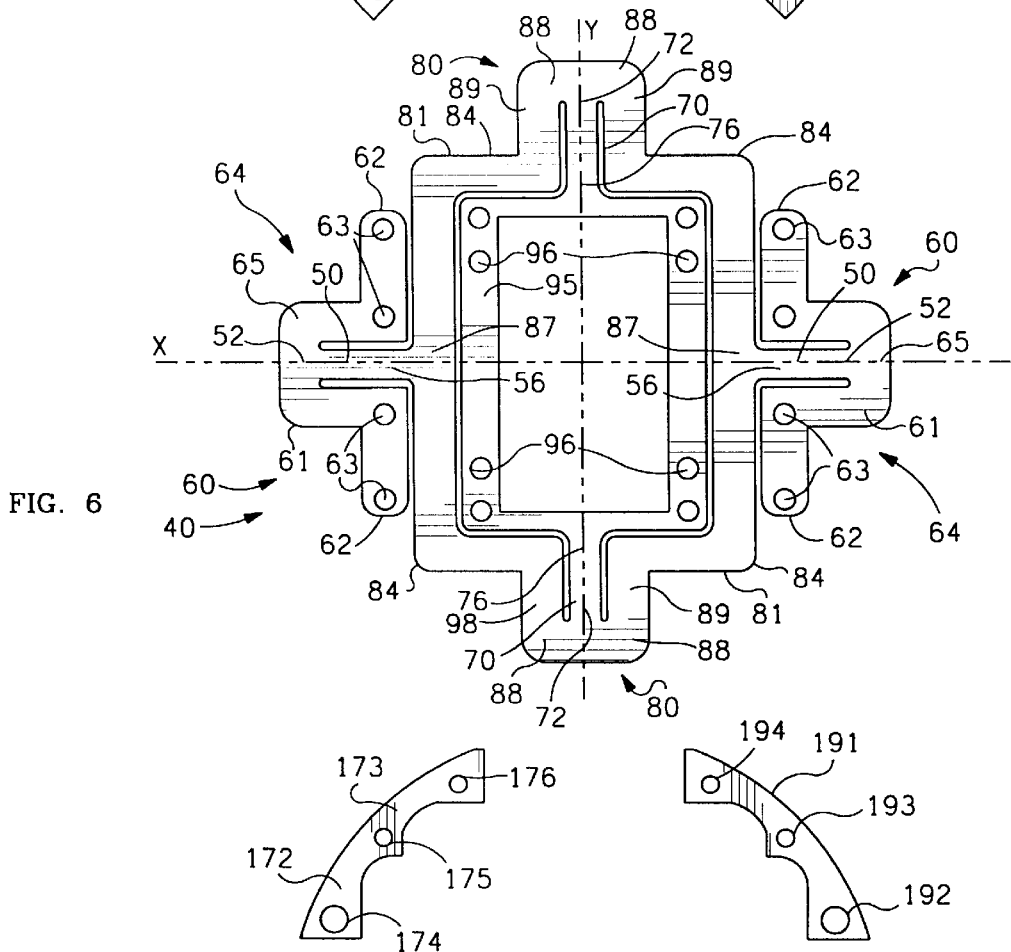
FIG. 6 is a bottom plan view of the first pair of connectors and the gimbal.

Looking also at FIG. 6 there is shown a bottom plan view of gimbal 40. Gimbal 40 may be machined out of a sheet of spring steel as shown or constructed of other suitably strong, resilient materials. Gimbal 40 supports horn 100 such that horn 100 may move in the Z direction and may rotate about an X axis an a Y axis but may not move in the X or Y directions.

Gimbal 40 generally includes a pair of outer torsion members 50, having in top view a longitudinal axis defining an X-axis defining the X-direction and defining a Y-direction horizontally perpendicular thereto. Each outer torsion member 50 has an outer end 52 and an inwardly disposed inner end 56, that is disposed toward horn 110 and inner end 56 of the other outer torsion member 50. In the preferred embodiment, outer torsion members 50 have a rectangular vertical cross-section having a width of approximately ten times the height. The moment of inertia of the cross section about its neutral Z-axis is very high such that, relative to outer end 52, inner end is essentially not translatable in the Y-direction. The polar moment of inertia of the cross section is such that, relative to outer end 52, inner end 56 is easily torsionally rotatable about its X-axis. The moment of inertia of the cross section about its neutral Y-axis is such that, relative to outer end 52, inner end 56 could move under force in the Z-direction, but, since outer torsion members 50 are linear and basically non-stretchable, inner ends 56 can not move in the Z-direction relative to outer ends 52 unless outer ends 52 move inward.

Gimbal 40 includes a pair of outer connection means 60, such as outer connector 61. Each outer connector 61 being associated with an outer torsion member 50 and with a gimbal support 33 and including a first end 62 connected to its associated gimbal support 33, such as with fasteners, not shown, through holes 63 and into threaded bore bores 34, and a cantilever spring section 64 supporting a second end 65 that is connected to outer end 52 of its associated outer torsion member 50. Second end 65 of outer connector supports outer end 52 of associated outer torsion member 50 in the Z-direction and such that outer end 52 cannot rotate about the X-axis and cannot move in the Y-direction.

Preferably, as shown, cantilever spring section 64 is cantilevered outward parallel to the longitudinal axis of outer torsion member 50 such that second end 65 and may move in the Z-direction and inward in response to Z-forces exerted in it by outer torsion member 50. Since Z-direction forces on horn 100 are transferred outward to outer torsion members 50, this construction provides for movement of horn 100 in the Z-direction from Z-direction forces on it.

A pair of inner torsion members 70 have in top view a longitudinal axis defining a Y-axis perpendicular to the X-axis. Each inner torsion member 70 has an outer end 72 and an inner end 76 disposed toward inner end 76 of the other inner torsion member 70. Inner torsion members 70 are constructed and function the same as outer torsion members 50 discussed above in that, relative to outer end 72, inner end 76, is torsionally rotatable about its Y-axis but is not translatable in the X-direction and cannot move in the Z-direction unless its outer end 72 moves in the Z-direction and inward. Inner end 76 of inner torsion members 70 is connected to a horn support means, such as horn support ring 95 which is fastened to horn 100, such as by fasteners 99, through holes 96 in ring 95 and into threaded bores 125 in horn 100.

An inner connection means 80, such as inner connector 81, is associated with each inner torsion member 70. Each inner connector 81 includes two arms 84. Each arm 84 has an associated outer torsion member 50 and has an outer end 87 connected to inner end 56 of its associated outer torsion members 50 and an inner end 88 connected to outer end 72 of its associated inner torsion member 70. Inner connector 80 supports outer end 72 of associated inner torsion member 70 in the Z-direction and such that outer end 72 of associated inner torsion member 70 cannot rotate about the Y-axis and cannot move in the X-direction. Preferably, as shown, cantilever spring section 89 is cantilevered outward parallel to the longitudinal axis of inner torsion member 70 such that outer end and may move in the Z-direction and inward in response to Z-forces exerted in it by inner torsion member 70. Since Z-direction forces on horn 100 are transferred outward to inner torsion members 70, this construction provides for movement of horn 100 in the Z-direction from Z-direction forces on it.

Figure 8:
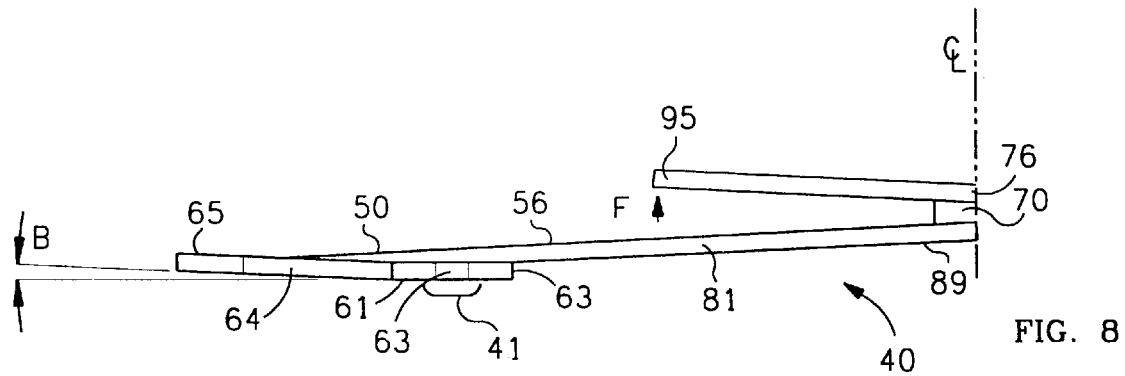
FIG. 8 is an enlarged exaggerated plan view of the left half of the gimbal of FIG. 3 showing relative movements of the elements.
Figure 9:
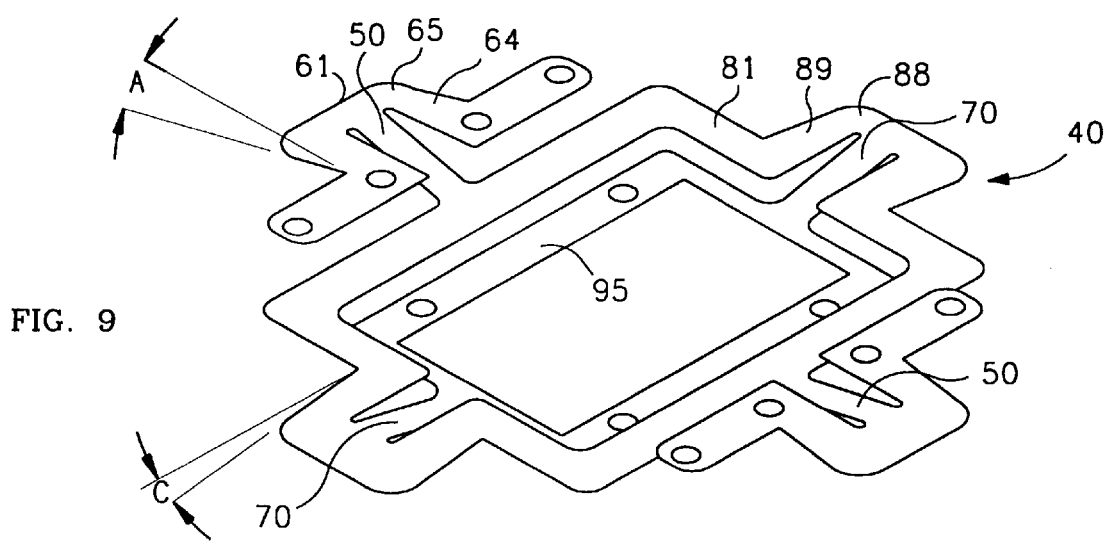
FIG. 9 is an enlarged bottom perspective view of the gimbal spring showing some of the relative movement of the elements.

Turning also to FIGS. 8 and 9, the above description is further clarified. FIG. 8 is an enlarged exaggerated plan view of the left half of gimbal 40 showing relative movements of the elements when force F is applied to horn support ring 95. Fastener 41 through hole 63 in first end 62 of outer connector 61 connects gimbal 40 to frame 20. Outer connector 61 includes cantilever section 64 including a second end 65 that arcs upward through angle B and inward responsive to force F transferred through the members. The upward and inward movement of second end 65 allows inner end 56 of outer torsion member 50 to move upward. Inner connector 81 includes cantilever section 89 allowing inner end 88 to rise and move inward. The inward movement of inner end 88 allows inner end 76 of inner torsion member 70 to rise.

FIG. 9 is an enlarged perspective bottom view of gimbal 40 showing some of the relative movement of the elements when horn 100, not shown, is moved vertically relative to frame 20. Upward movement of horn support ring 95 in the Z-direction causes the inner ends 88 of cantilever spring section 89 to move an angle C such that inner ends 88 move upward and inward and causes the second ends 65 of cantilever sections 64 to move an angle A such that second ends 65 move upward and inward. These rotations allow movement of horn support ring 95 in the Z-direction.

Horn 100 is securely fastened to horn support ring 95 of gimbal 40 by fasteners, such as bolts, which pass through bores 99 in clamp ring 98 and bores 96 in support ring 95 and into threaded bores 125 in horn. Horn 100 has a left side 101, a right side 103, a front 105, a rear 110, a top 130 and a horn tip 120 having a bottom 121 including a contact area for contact with the contact area of workpiece 225, 230. The contact area of bottom 121 may be flat or may be of any suitable shape to perform the desired task. In the illustration, the contact area is flat and an elongated rectangle to join circuit 225 to component 230. Typically, bottom 121 of horn 100 is configured to be just the contact area but bottom 121 may be larger. Heat and pressure is applied through the contact area to the workpieces to join them. The envelope of the contact area is the shortest perimeter that will enclose the contact area. An inverted cavity 132 on top 130 accepts pivot rod 140. Horn 100 may include one or more electrical devices. In the embodiment shown, a pair of heater elements 136, one on each side of pivot cavity 132, heat horn bottom 121. A thermocouple 138 is attached to or is placed inside horn 110 monitor the temperature of tip 120 for controlling heaters 136.

Four insulated electrical contact posts 123 project downward. As best seen in FIG. 4, the two front posts 123T are connected to thermocouple 138 by insulated wires 139 and two rear posts 123H are connected to heaters 136 by wires 137.

Pivot rod 140 includes a lower end 142 including a tip 143. Tip 143 includes a bearing surface 144 for bearing against inner end 133 of cavity 132 such that horn 100 may rotate about the X-axis and Y-axis and for applying downward pressure to horn 100. For rotation about an X-axis, bearing surface 144 and inner end 133 of cavity 132 may be arcs of a circle in an Y-Z plane. For rotation about a Y-axis, bearing surface 144 and inner end 133 of cavity 132 may be arcs of a circle in an X-Z plane. The total area of bearing surface 144 transfers the pressure to workpieces 220. The shape and orientation in top view of bearing surface 144 is substantially an ellipse that corresponds to the shape and orientation of the envelope of the contact area of bottom 121 of horn 100. That is, if the envelope of the contact area is an elongated rectangle having a long axis as shown in the drawing, then bearing area 144 is an elongated ellipse having a similarly oriented long axis. The shape of the bearing ellipse varies between being circular for a square or circular envelope, to being a line, i.e. a very long narrow bearing ellipse, as is illustrated, for an envelope that results from an very elongated rectangle having a longitudinal axis. It is desirable that the size of the bearing ellipse, and thus the area of the bearing surface, be as small as will practicably accommodate the bonding pressure required. As seen in FIG. 3, in front view, tip 143 of pivot rod 140 is almost a knife edge such that the bearing ellipse is very narrow, or may even a be a line, such that very small forces from workpieces 225, 230 are required to overcome friction and to rotate horn 100 about the Y-axis to align the contact areas. In contrast, in FIG. 1, in side view, tip 143 is wide such that large moment forces are required to rotate horn 100 about the X-axis. However, the shape of bearing surface 144 provides that the forces exerted by workpieces 225, 230 on horn 100 to produce the alignment moments are substantially similar.

Preferably the pivot points of bearing surface 144 is as close as practicable to the intersection of the X-axis and the Y-axis of torsion members 50,70 as this reduces the moment force required to rotate the head 110 into alignment with workpiece 230. Horn 100 may rotate about tip 143 and the X-axis and Y-axis to align with workpieces 225, 230 as pivot rod 140 applies downward pressure to horn 100 during encounter with workpieces 225, 230. Interference between pivot rod 140 and the wall of cavity 132 limits the maximum amount of rotation of horn 100.

Horn biasing means, such as horn biasing spring 160, lightly biases horn 100 the downward direction. Horn biasing spring 160 is a leaf spring supported at its outer ends by supports 25 and arched upward so as to impart a small downward force on pivot rod 140 which transfers the force to horn 100. Although leaf spring 160 is shown, other means are contemplated. For example, a coil spring could be used between a slightly larger stop 155 and base 22.

Pivot rod upper end 145 terminates in a transfer rod 150. Transfer rod 150 includes an upper guide rod 153 for sliding vertical travel in bushing 24 in base 22 and a flange or stop 155. As seen in FIG. 3, in the non-pressure situation, there is a slight gap 156 between stop 155 and bushing 24. Thus, when horn 100 first encounters workpiece 230 there is only the small downward force of bias spring 160 on horn 100 such that horn 100 may easily gimbal as necessary upon encountering workpiece 230. As is shown in FIG. 1, once the encounter with workpiece 230 has forced horn 100 upward the distance of the gap 156, then stop 155 encounters bushing 24, pivot rod 140 is prevented from further upward movement, and the full pressure of linear thruster 200 is transferred through pivot rod 140 to horn 100 to workpiece 230.

Figure 7:
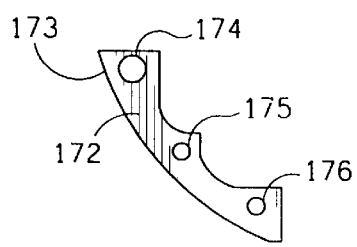
FIG. 7 is a bottom plan view of the adjustment plates and a contact plate.
Figure 7:
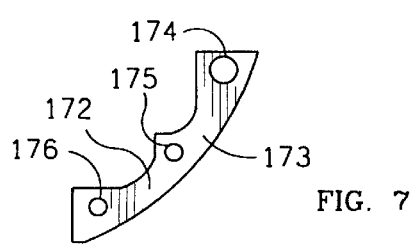

With reference to FIGS. 2 and 7, there is shown adjustment means or zeroing means 170 connected to frame 20 for selectively applying a force or forces to horn 100 for rotating horn 100 about the X-axis and/or the Y-axis such that horn 100 is biased to given angular configuration prior to encountering workpiece 230. FIG. 7 is a bottom plan view of adjustment plates 173 and a contact plate 191.

In the preferred embodiment shown, zeroing means 170 includes three adjustment assemblies 172. Each adjustment assembly 172 includes an adjustment plate 173 including an adjust arm 180, biasing means, such as spring 178 and adjustment screw 185. Bearing 174 of adjustment plate 173 is slidingly disposed on journal 36 of frame 20. Adjustment screw 185 is freely journaled in bore 175 and threadingly engaged in threaded bore 38 in frame 20. Spring 178 surrounds adjustment screw 185 between plate 173 and frame 20 and downward biases plate 173 such that movement of adjustment screw 185 moves plate 173 up and down. Adjustment arm 180 connected to each plate 173, such as by clamp 181 and fastener 182 in threaded bore 176, contacts an electrical contact post 123 of horn 100 such that as plate 173 moves horn 100 is rotated. Adjustment arm 180 of each adjustment assembly contacts a different contact post 123 on horn 100. Three adjustment arms 180 contacting horn 100 determine a plane of rotation for horn 100.

In the preferred embodiment, adjustment arms also function as electrical conductors to heaters 136 and thermocouple 138. Each adjust arm 180 is electrically connected to a conductor, such as wire 184. As best seen in FIG. 4, the left front adjust arm 180 makes electrical connection with one input of thermocouple 138 and the rear adjust arms 180 make electrical contact with heater leads 137. In this manner, there is no moment placed on horn 100 by the electrical couplings to heaters 136 and thermocouple 138.

A contact assembly 190 functions as the fourth electrical contact to horn 100. Contact assembly 190 is similar to adjustment assembly 172 and includes a contact plate 191 including bearing 192, free bore 193 and threaded bore 194. A contact arm 195 is attached to plate 191 such as by clamp 196 and screw 197 in bore 194. Contact arm 195 is electrically connected to wire 184 for making electrical contact with thermocouple contact post 123T. As best seen in FIG. 3, weak spring 198 between the head of adjustment screw 199 lightly biases plate 191 and contact arm 195 for electrical contact with contact post 123T. Spring 198 is much weaker that biasing spring 160 such that the contact arm 195 does not rotate horn 100. In this manner all of the electorial contacts are made.

Having described the invention, it can be seen that it provides for a gimbaled head having requiring substantially equally low forces for rotating the horn about the X and Y axes for alignment with the workpieces.

Although a particular embodiment of the invention has been illustrated and described, various changes may be made in the form, composition, construction, and arrangement of the parts without sacrificing any of its advantages. For example, the drawings illustrate a preferred embodiment of one extreme of the invention, that is where the bearing area 144 is substantially linear to correspond to a long, narrow contact surface. From this example, it is easily seen how the bearing area can be varied according to the principles of the invention to be any ellipse including a circle. Therefore, it is to be understood that all matter herein is to be interpreted as illustrative and not in any limiting sense, and it is intended to cover in the appended claims such modifications as come within the true spirit and scope of the invention. In the claim, the directions, such as vertical, horizontal, up and down are relative for descriptive purposes and are not absolute directions.

I claim:

1. A head for contacting in a vertical Z-axis direction a contact area on a workpiece; said head comprising:
   a frame:
      a gimbal supported by said frame;
      a horn supported by said gimbal; said horn having:
         a top; and
         a bottom having:
            a contact area for contacting the contact area of the workpiece; said horn supported by said gimbal so as be rotatable about horizontal X and Y axes responsive to contact with the workpiece;
   a pivot rod including:
      an upper end; and
      a lower end including:
         a bearing having a bearing surface bearing against said top of said horn such that said horn may rotate about the X-axis and Y-axis and for applying downward pressure to said horn; the shape and orientation in top view of said bearing surface corresponding to the shape and orientation in top view of said contact area of said bottom of said horn.

2. The head of claim 1 further including:
adjustment means connected to said frame for applying force to said horn for rotating said horn about the X-axis or the Y-axis to a desired position before contact with the workpiece.

3. The head of claim 2 wherein:
said horn includes an electrical device; and
said adjustment means simultaneously provides electrical communication with said electrical device.

4. The head of claim 1 wherein:
said gimbal supports said horn such that responsive to contact with the workpiece, said horn can translate in the Z-direction relative to said frame.

5. The head of claim 4 further including:
adjustment means connected to said frame for applying force to said horn for rotating said horn about the X-axis or the Y-axis to a desired position before contact with the workpiece.

6. The head of claim 5 wherein:
said horn includes an electrical device; and
said adjustment means simultaneously provides electrical communication with said electrical device.

7. A head for contacting in a vertical Z-axis direction a contact area on a workpiece; said head comprising:
   a frame:
      a gimbal supported by said frame;
      a horn having:
         a top; and
         a bottom having:
            a contact area for contacting the contact area of the workpiece; said contact area of said bottom defining an envelope; said horn supported by said gimbal so as be rotatable about horizontal X and Y axes responsive to contact with the workpiece;

a pivot rod including:
  an upper end; and
  a lower end including:
    a bearing having a bearing surface bearing against said top of said horn such that said horn may rotate about the X-axis and Y-axis and for applying downward pressure to said horn; said bearing surface defining an elliptical envelope; the shape and orientation in top view of the bearing envelope corresponding to the shape and orientation in top view of the envelope of said contact area of said bottom of said horn.

8. The head of claim 7 further including:

adjustment means connected to said frame for applying force to said horn for rotating said horn about the X-axis or the Y-axis to a desired position before contact with the workpiece.

9. The head of claim 8 wherein:

said horn includes an electrical device; and said adjustment means simultaneously provides electrical communication with said electrical device.

10. The head of claim 7 wherein:

said gimbal supports said horn such that responsive to contact with the workpiece, said horn can translate in the Z-direction relative to said frame.

11. The head of claim 10 further including:

adjustment means connected to said frame for applying force to said horn for rotating said horn about the X-axis or the Y-axis to a desired position before contact with the workpiece.

12. The head of claim 11 wherein:

said horn includes an electrical device; and said adjustment means simultaneously provides electrical communication with said electrical device.

13. A head for contacting in a vertical Z-axis direction an elongate contact area on a workpiece; said head comprising:
  a frame:
    a gimbal supported by said frame;
    a horn having:
      a top; and
      a bottom having:
        a substantially elongate contact area having a longitudinal axis responsive to contact with the workpiece; said bottom contact area for contacting the contact area of the workpiece; said horn supported by said gimbal so as be rotatable about horizontal X and Y axes;
  a pivot rod including:
    an upper end; and
    a lower end including:
      a bearing having a bearing surface; said bearing surface being substantially linear in top view corresponding to the longitudinal axis of said contact area of said bottom of said horn and bearing against said top of said horn such that said horn may rotate about the X-axis and Y-axis and for applying downward pressure to said horn.

14. The head of claim 13 wherein:

said bearing surface in top view has a length and a width corresponding to the length and the width in top view of said contact area of said bottom of said horn.

15. The head of claim 13 further including:

adjustment means connected to said frame for applying force to said horn for rotating said horn about the X-axis or the Y-axis to a desired position before contact with the workpiece.

16. The head of claim 15 wherein:

said horn includes an electrical device; and said adjustment means simultaneously provides electrical communication with said electrical device.

17. The head of claim 13 wherein:

said gimbal supports said horn such that responsive to contact with the workpiece, said horn can translate in the Z-direction relative to said frame.

18. The head of claim 17 further including:

adjustment means connected to said frame for applying force to said horn for rotating said horn about the X-axis or the Y-axis to a desired position before contact with the workpiece.

19. The head of claim 18 wherein:

said horn includes an electrical device; and said adjustment means simultaneously provides electrical communication with said electrical device.

* * * * *